(12) United States Patent
Burton, Jr.

(10) Patent No.: US 7,937,098 B2
(45) Date of Patent: May 3, 2011

(54) HOLD DIRECT

(76) Inventor: Clayton B. Burton, Jr., Clearwater, FL (US)

( * ) Notice: Subject to any disclaimer, the term of this patent is extended or adjusted under 35 U.S.C. 154(b) by 758 days.

(21) Appl. No.: 10/795,125

(22) Filed: Mar. 5, 2004

(65) Prior Publication Data

US 2006/0150181 A1 Jul. 6, 2006

(51) Int. Cl.
*H04W 88/02* (2009.01)
(52) U.S. Cl. ........................................... 455/503
(58) Field of Classification Search ............... 707/1–10, 707/100–104.1, 200–206; 381/119; 379/201.2, 379/215.06, 88.22, 101.01, 162, 202.01; 455/556, 3.02, 45, 132, 503; 713/201
See application file for complete search history.

(56) References Cited

U.S. PATENT DOCUMENTS

| 5,870,461 | A | 2/1999 | Hazenfield |
| 5,991,374 | A | 11/1999 | Hazenfield |
| 6,526,335 | B1 * | 2/2003 | Treyz et al. ................ 701/1 |
| 6,556,670 | B1 | 4/2003 | Horn |
| 6,625,464 | B1 | 9/2003 | Bandy et al. |
| 6,751,306 | B2 * | 6/2004 | Himmel et al. .......... 379/201.02 |
| 7,076,035 | B2 * | 7/2006 | Loudermilk ............. 379/101.01 |
| 7,212,516 | B1 * | 5/2007 | O'Sullivan et al. ........... 370/352 |
| 2001/0029192 | A1 * | 10/2001 | Oh ................................. 455/556 |
| 2002/0136384 | A1 * | 9/2002 | McCormack et al. ... 379/215.01 |
| 2002/0146106 | A1 * | 10/2002 | Himmel et al. .......... 379/215.01 |
| 2003/0043979 | A1 * | 3/2003 | Smith ......................... 379/88.22 |
| 2004/0089133 | A1 * | 5/2004 | Georges ......................... 84/609 |
| 2004/0117660 | A1 * | 6/2004 | Karaoguz et al. ............. 713/201 |
| 2005/0021678 | A1 * | 1/2005 | Simyon et al. ................ 709/219 |
| 2006/0023901 | A1 * | 2/2006 | Schott et al. .................. 381/119 |
| 2006/0195604 | A1 * | 8/2006 | Goodman et al. ............ 709/232 |
| 2008/0056955 | A1 * | 3/2008 | Maswadeh et al. ........... 422/101 |

* cited by examiner

*Primary Examiner* — Diane Mizrahi
(74) *Attorney, Agent, or Firm* — James David Johnson (57) ABSTRACT

A system for providing online access to on-hold messages: an interface by which an end user can access at least one on-hold message from an online database; a system for downloading at least one message as a file to be played on an end user phone answering system. The downloaded message comprises an MP3 file and may be downloaded onto a flash card.

6 Claims, 11 Drawing Sheets

HOLD DIRECT

FIELD OF THE INVENTION

The present invention is directed to a method and apparatus for downloading "on-hold" messages for use in telephone systems. In particular, the present invention is directed to a system for permitting end users and companies to easily and quickly author, edit, approve, and download on-hold messages from a remote website.

BACKGROUND OF THE INVENTION

One of the fastest growing areas of business is the use of on-hold messaging systems to provide general business and marketing information and the like. The simplest on hold system plays background music while the end user is on hold. More recently, companies have begun to combine music with voiceovers. The inclusion of voiceovers permits businesses to incorporate news about the business and new products or services. Today, on hold systems provide valuable information to potential and existing customers.

There are a number of patents and patent applications directed to these systems. U.S. Published Patent Application No. 2003/0043979A discloses a system for providing a single on-hold audio message to a plurality of business telephone systems at separated geographic locations converts the audio message into digital form, compresses the resulting digital file, and transmits the file via the Internet as an attachment to an e-mail message to general purpose computers located in association with each of the business telephone systems. Each of the general purpose computers receiving the message writes it onto a floppy disc which is provided to an associated playback unit. The playback units read the compressed digital files representing the on-hold message, provide the re-circulating flash memories, provide the output of the flash memories to de-compressors and the output of the de-compressors to digital-to-analog converters. The resulting audio signals are applied to the on-hold inputs of each of the business telephone systems.

U.S. Pat. No. 5,870,461 discloses an on-hold messaging system is provided for use with a business telephone system having an on-hold audio input. The system includes an optical disc having one or more messages recorded thereon, an optical disc player having an audio output, and a connection or interface between the audio output of the optical disc player and the on-hold input of the business telephone system. The optical disc player is enabled to continuously play the message or messages through the business telephone system, so that at least a portion of a message can be heard by an outside party when a telephone call between the outside party and a user of the business telephone system has been completed and the outside party is placed on hold by a user of the business telephone system. Optionally, an audio amplifier may be used as an interface between the optical disc player and the on-hold input of the business telephone system, so that the sound quality of the message as heard by the outside party is satisfactory.

U.S. Pat. No. 6,625,464 discloses a point to multipoint messaging system includes utilizing the FM 57 kHz Radio Broadcast Data System (RBDS) standard and a novel receiver. A single broadcast source sends messages from multiple senders, in a variety of manners including automatically and semi-automatically, to a plurality of receivers who may select to receive or not to receive particular senders' messages. The receiver is remotely programmable by the user so that the user may select to receive at least some messages U.S. Pat. No. 6,556,670 is directed to audio conference calls. The music on-hold-problem occurs when a conferee having music-on-hold puts the conference call on hold, resulting in a continuous stream of music being transmitted to the other conferees. Such a conferee is called an offending conferee. The solution presented herein is to prevent music-on-hold signals emanating from an offending conferee from being passed through an audio conference bridge to the other conferees. This is accomplished, in particular embodiments, by directing a merging/summing subsystem of the audio conference bridge to temporarily stop combining audio emanating from the offending conferee from being combined or merged onto audio channels through which the other conferees communicate on the audio conference. Once the music-on-hold is terminated, the offending conferee can rejoin conference call by sending a signal that directs the merging/summing subsystem to resume the combining of audio signals emanating from the offending conferee onto the audio channels of the other conferees.

U.S. Pat. No. 5,991,374 is a remotely programmable message delivery system comprises a number of client computers which communicate with a server to send control signals to one or more remote message playback devices. The message playback devices are each provided with a library of messages, and comprise at least one music on-hold-compatible telephone system, a public address system or other audio and/or visual advertising device. Message playlists from the client computers can be sent via the server to the message playback devices by a communication link such as a radio paging system. The client computer is programmed to generate screens for guiding an operator to select messages from the library of messages and the order and times at which they are to be played by selected message playback devices. Message playback devices can be organized into one or more regions to allow a message playlist to be sent to more than one message playback device using a single radiopaging signal.

Most of the prior art is characterized by basic systems which provide simple systems in which on-hold messages are provided by mail as tapes or physical media. The previous efforts at online systems have required that special software be resident on the customer's computer such as described in U.S. Pat. No. 5,991,374. This has made it both difficult and expensive to change and alter on-hold messages.

It is an object of the present invention to provide a system whereby the on-hold messages can be easily authored, selected and downloaded.

It is a further object of the present invention to provide a system by which on-hold messages can be easily downloaded onto an MP3 flash card format.

It is a further object of the present invention to provide an online system by which end users can easily access, upload, author and download on hold messages and by which end user customers can easily access and download on-hold messages.

These and other objects of the present invention will become apparent from the detailed description which follows.

SUMMARY OF THE INVENTION

In accordance with the present invention, a system for providing online access to on-hold messages is disclosed. In a preferred embodiment, the system comprises and an interface by which an end user can access at least one on-hold message from an online database; and a system for downloading at least one message as a file to be played on an end user phone answering system. In a further embodiment, the downloaded message comprises an MP3 file. In a further embodiment, the downloaded MP3 message is downloaded onto a compact flash card.

A system for creating, editing, and handling on-hold messages comprising an online interface wherein an end user can enter author, upload access and download at least one more on-hold messages from a database; administrator means for editing and adding on-hold messages which can be accessed; means for encrypting the message; and means for downloading the encrypted message on to a compact flash card.

A method for downloading and playing an on-hold message comprising the following steps; downloading an on-hold message comprising an MP3 file onto a compact flash card; and inserting the compact flash card and file into a messaging system.

DETAILED DESCRIPTION OF THE INVENTION

The present invention is described with reference to the enclosed Figures wherein the same numbers are utilized where applicable. The present invention comprises a system whereby messages to be played on hold recorded can be selected and created online and rapidly downloaded as a playable file and preferably via an MP3 Flash Card. In a most preferred embodiment, the invention comprises an interface whereby an end user can sign up for the services and place in or upload a plurality of prospective on-hold messages.

Figure 1:
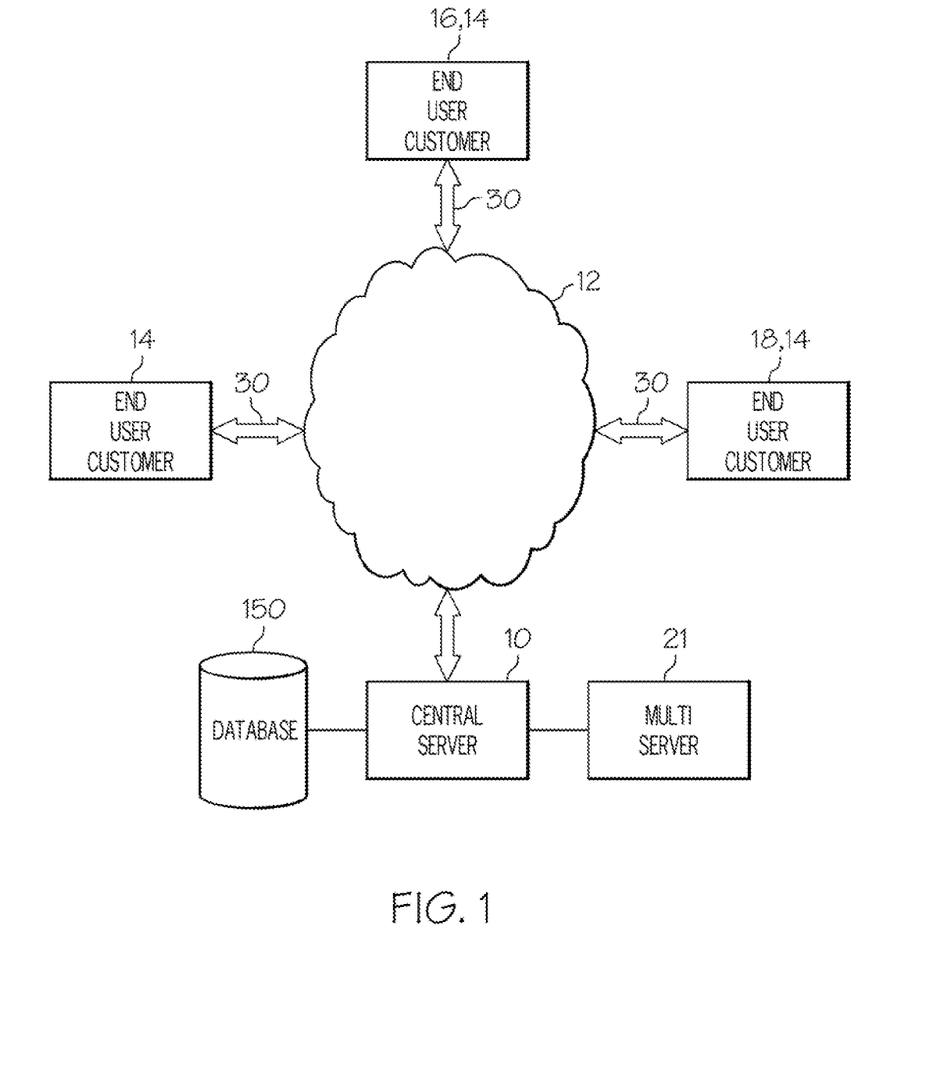
FIG. 1 is an overview block diagram of the system.

Referring to FIG. 1, a most preferred embodiment of the present invention is disclosed and shown. The most preferred embodiment comprises a central computer server 10 connected by a computer network 12 to remote end user stations 14. The central server connects to a database 150. As will be discussed herein, the database 150 will include data related to end users and their respective on-hold messages.

In a preferred embodiment, end user stations 14 comprise a plurality of end users 16, 18. End users 16, 18 are defined herein as entities linked to the system who comprise companies and individuals who desire to upload, author or download on-hold messages. Users 16, 18 are linked with the central computer server 10 via a transport medium 30. End users 16, 18 will typically comprise companies, professionals and individuals that desire to create, access and download on hold messages. In a most preferred embodiment, will be linked via a global computer network 12 such as the Internet or Worldwide web, but other embodiments including LANs, WANs and Intranets, which fulfill the spirit and scope of the present invention.

The end user devices 16, 18 will typically comprise any device that connects to the system via the Internet or other IP transport methods and includes, but is not limited to, such devices as televisions, computers, hand-held devices, cellular phones, land based telephones, wireless electronic devices and any device which uses a transport medium 30. Non-limiting examples of a transport medium 30 applicable for use in the present invention comprise any backbone or link such as an ATM link, FDDI link, satellite link, cable, cellular, twisted pair, fiber optic, broadcast wireless network, the internet, the world wide web, local area network (LAN), wide area network (WAN), or any other kind of intranet environment such a standard Ethernet link. In such alternative cases, the end user will communicate with the system using protocols appropriate to the network to which that client is attached. All such embodiments and equivalents thereof are intended to be within the scope of the present invention.

Referring again to FIG. 1, the present invention may comprise a multi-server 21 environment which comprises a computer system in accordance with the present invention that allows the multiple end users 16, 18 to communicate with the system. Through communication link and transport medium 30, end user customers and end users 16, 18 are linked to the central server 12, preferably by a customizable interface to be described in greater detail below.

Figure 2:
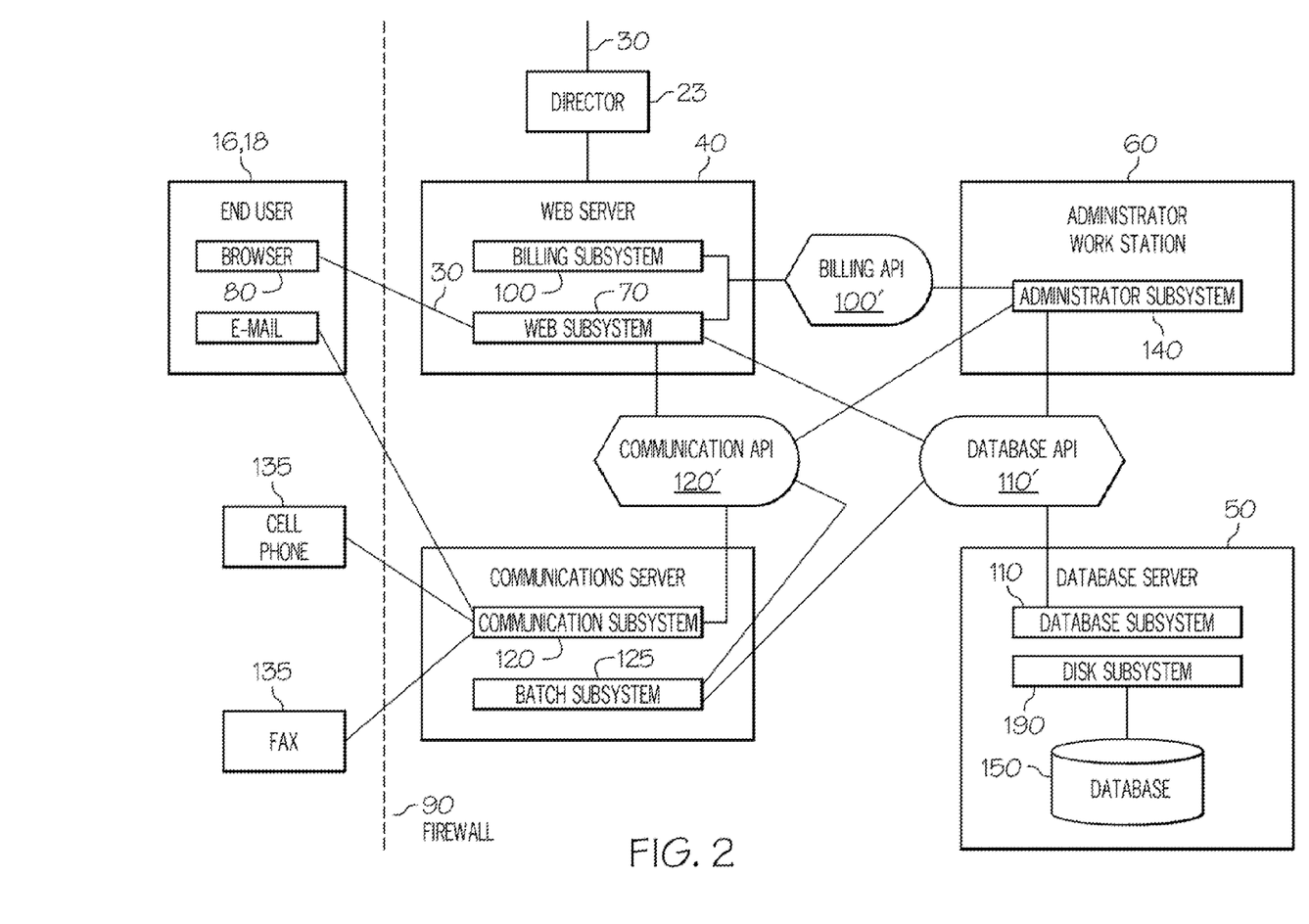
FIG. 2 is a detailed diagram of the system.
Figure 3:
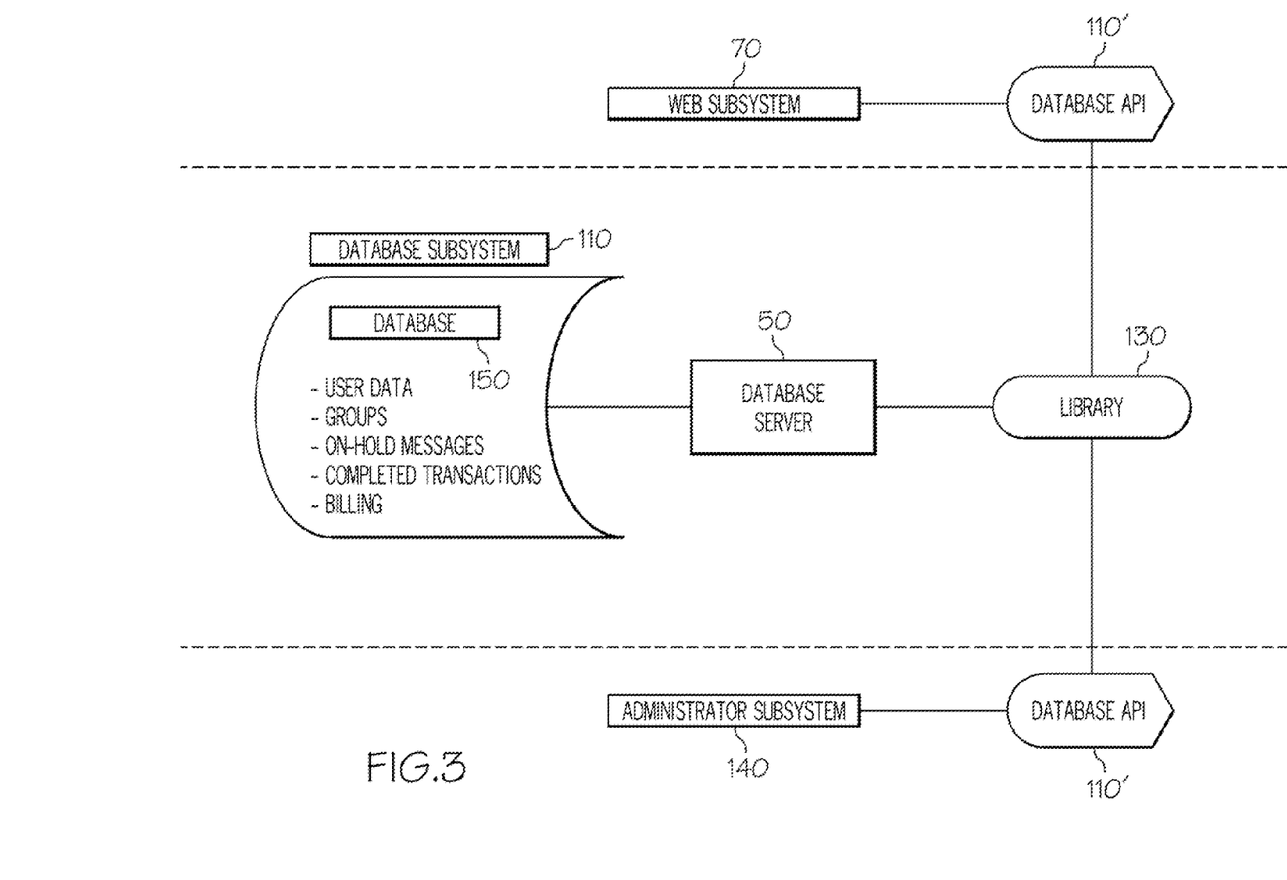
FIG. 3 illustrates the database architecture of the present invention.

Referring to FIGS. 2 and 3, the central server and database systems of the present invention are now shown and described in greater detail. A local director 23 routes signals through the system to the various servers, to be described below, and to and through transport medium 30 to end users 16, 18. The system preferably includes two primary servers, a web server 40 and a database server 50 which may operate using such database platforms as SQL server or Oracle. The system may operate under other platforms such as ASP and JAVA (e.g. J2EE) Hence, in one embodiment the SQL server may run SQL server database management software from Microsoft Corporation.

Alternatively, the server can further comprise an Oracle database server. The system further includes an administrative work station 60 or system which provides the administrative capabilities and monitoring for the system under the control of an administrative subsystem 140. The administrative work station 60 allows administrators or other operators to perform routine operations which affect the entire system. Such operations include, but are not limited to, administering the accounts of end users 16, 18 monitoring the traffic through the system, the tabulating of user balances and ratings, printing reports and maintaining the programs that comprise the over all system as well as uploading new on-hold files.

A web subsystem 70 is responsible for all interactions with a web browser 80 in the end user devices 16, 18 and serves as the end user interface to the system. All interactions between the end user devices 16, 18 and the database subsystem occur through the web subsystem 70. Internet Information Server 200 (IIS) by Microsoft Corporation is an exemplary web server software system 70 in accordance with the present invention, although the present invention is in no way limited to this system. The expression of the user interface presented to end users 16, 18 in their client devices may be implemented as HTML or other high level computer language or technology, and may be displayed in a standard web browser.

All world wide web systems listed above are preferably communicated, for example, by an Ethernet 100 base T network and a switching hub. In addition, a second isolated network segment will preferably exist between the web server 40 and the external communications hardware (e.g. internet router). Such a system will keep external traffic isolated from the internal network, as well as provide a dedicated connection between the web server 40 and the Internet for maximum throughput. The systems will have an initial configuration of random access memory for the web server 40 and preferably at least 128 megabits for the database server 50, both having the capability to expand.

The web server 40 may be a point of entry to the entire system. The system determines the identity of the user 16, 18 and makes appropriate decisions while serving web pages to the end user 16, 18. The web server 40 sends HTML, XML, JAVA, or other high level computer language to the end user work stations 16, 18, validates passwords, sends logging and transaction information to the database server 50, and performs logical operations, thus behaving as a transactional server.

As noted above, in one embodiment, the server operating system may be a Windows NT server, a multi-platform operating system provided by Microsoft Corporation. The Sun Microsystems Solaris is an alternative embodiment. The server typically includes IIS, which is a completely integrated Internet application platform. IIS includes a high-performance web server, an application development environment, integrated full-text searching, multi-media streaming and site management tools. The security infrastructure is integrated within the server, thus enabling an easy-to-maintain and highly-secure web development and deployment environment. It is to be appreciated that the invention envisions new and expanding technologies.

The operators of the central system may create, delete and update account information by utilizing the administrative subsystem 140 in administration work station 60. A billing subsystem 100 is used for crediting and debiting end user accounts.

Database 110, communication 120 and billing 100 subsystems thus execute essential services for the other parts of the system, and will therefore have well-defined application program interfaces (API) 110', 120', 100', as is well recognized by those with skill in the art. The system will preferably be protected for the Internet by a "firewall" 90 which is a safety precaution, and important with respect to the present invention due to the sensitive and confidential nature of the information in the database. As will be discussed below, firewall 90 plays an important and critical role in the present invention because of the confidentiality of the data associated with some applications of the present invention.

In a preferred embodiment, the database subsystem 110 stores all pertinent information related to user accounts, administrator accounts, payments and messages, as well as general dynamic system information. All interactions with the database subsystem 110 are performed through a database API 110' which may define the interface to a library of stored procedures 130. These are used to implement high-level database functions and to shield the details of the database implementation from the other subsystems. The database subsystem 110 is preferably implemented using database server 50.

The administration subsystem 140 provides an interface for operators and managers of the system to modify the database, print reports, view system data and log user comments and complaints. The administration subsystem 140 provides a collection of access forms, queries, reports and modules to implement the administration interface. Administrators typically will have the power within the system to force most actions. The administration subsystem 140 will interact with the communications, database and billing subsystems.

The communications subsystem 120 interfaced to a communications API 120' will be used to email and contact end users 16, 18. End users 16, 18 may be notified by phone, fax, email or pager, or other communications devices which can be contacted by the system 135. End users 16, 18 will also have a password accessed section of a website where they can access on-hold messages and obtain detailed reports.

A batch subsystem 125 may periodically send out grouped notifications. It will access the database subsystem 110 to determine what notifications are required, and uses the communication subsystem 120 to make those notifications. A group notification may comprise a special premium offered to end users 16, 18. The billing subsystem 100 will be used to verify and bill credit cards and communicate through the billing API 100' to the administration subsystem 140, and potentially to an outside billing and verification service which could be used to perform the billing functions.

Referring to FIG. 3, the database server 50 which implements the database subsystem 110 of the present invention comprises a server that maintains all associated logging and transaction information for the system. Through the database 150 (which is backed up by a backup database for safety purposes), the database server 50 logs information regarding the end user customers and their respective on-hold messages, maintains user account information, maintains account balances, produces and prints reports, hosts backup operations and performs statistical calculations for the entire system.

The database server 50 is preferably a dual processor computer microprocessor. Each connection to the database 150 and its associated work may be handled by a separate thread within the database server 50 process space. It is anticipated that a dual processor machine is sufficient for the type and amount of transactions that it will be performing, however if it proves insufficient, the database can be "striped" to two or more machines to distribute the server load.

Figure 4:
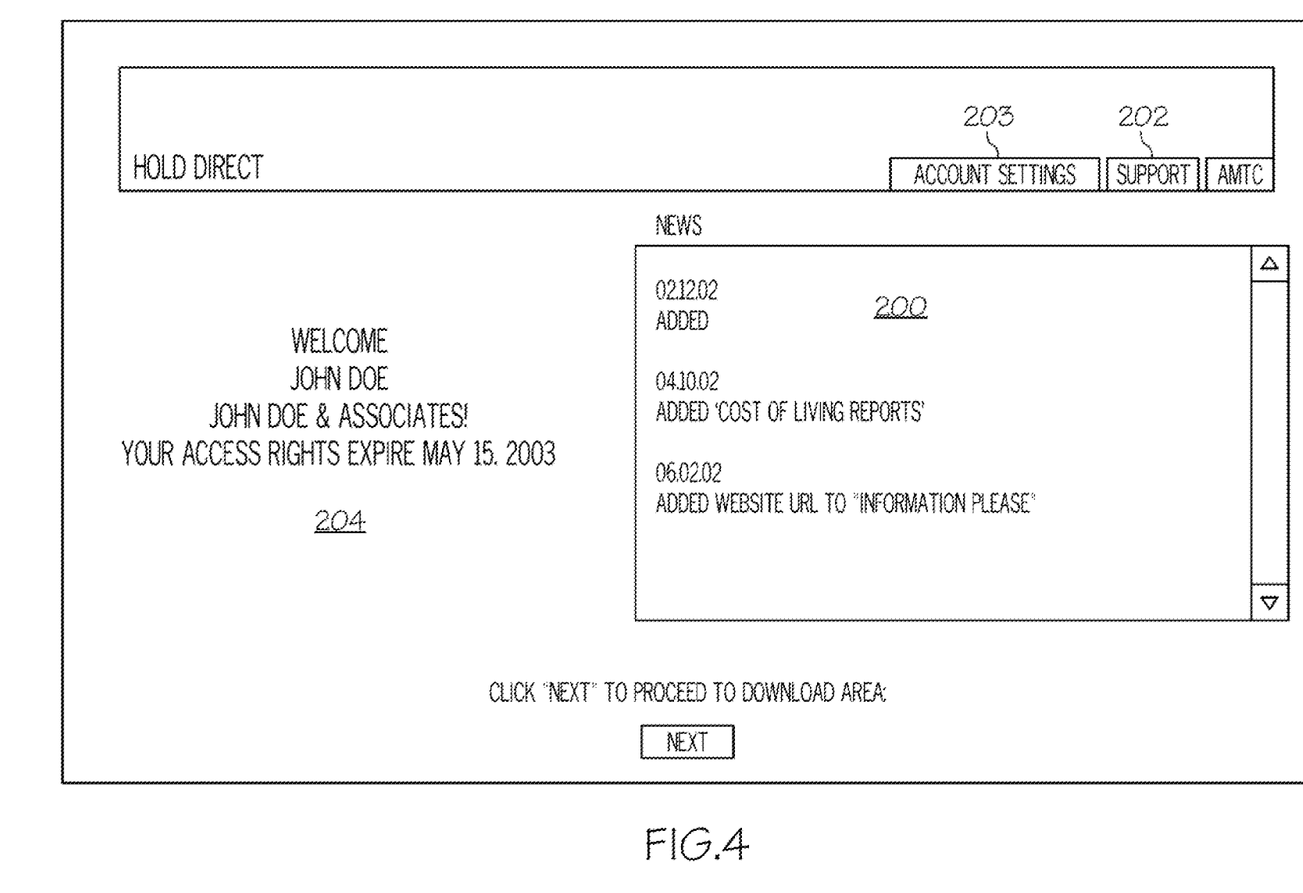
FIGS. 4 to 8 illustrate computer interface for use in the present invention.

With the above describing the operational background of the invention, referring to FIGS. 4 to 8, the present invention is described in the context of an online system for accessing/authoring and downloading on-hold messages. As shown in FIG. 4, the system comprises an initial homepage. The homepage may be the homepage of a website such as HoldDirect.com, assignee of the present invention. The homepage will illustrate information such as news 200, and buttons for support 202 and account settings 203. The home page may be personalized for the user 204.

In one embodiment, the system comprises a system whereby end users, customers and companies who desire on-hold messages can easily access those messages from a remote web server. In a most preferred embodiment, the on-hold messages are downloaded onto a compact flash card and then played on a player system associated with the telephone system. The flash card is designed to work with a system that stores and plays stored phone messages in association with the phone system.

Figure 5:
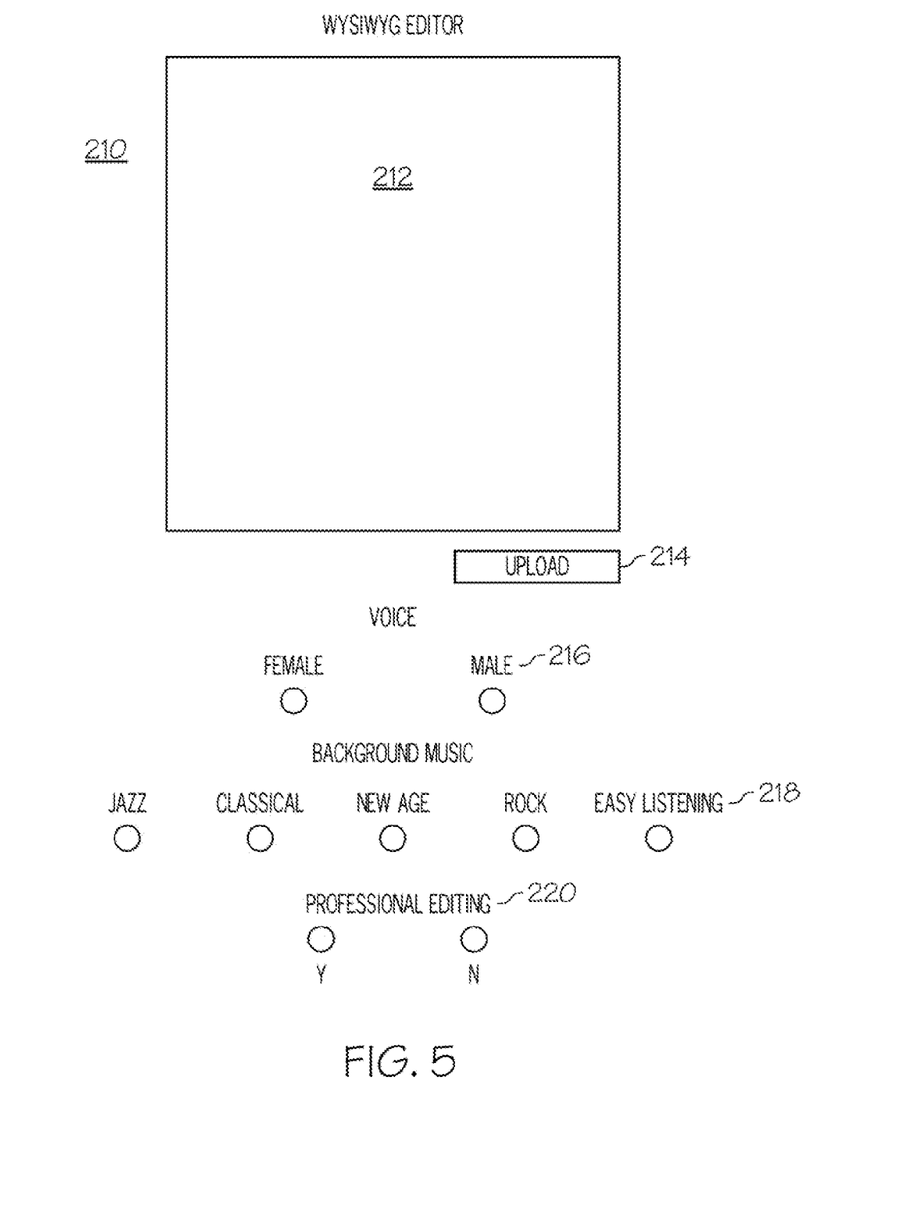

As shown in FIG. 5, the user is presented with a series of user screens in which he or she can complete a number of tasks related to the creation, editing and downloading of on-hold messages. The screen has a location for creating a script 210. The script can be composed online 212 or uploaded as a file 214. The end user can also input requests that the script be recorded by a male or female 216. The end user customer can also select the type of background music 218 which is to be used with the upload or created presentation. Examples of the types of background music include jazz, classical, new age, pop or rock, or easy listening 218. The message may or may not be professionally edited 220 according to the request of the end user. This may also be a billed service and thus tracked by the billing subsystem 110.

Figure 6:
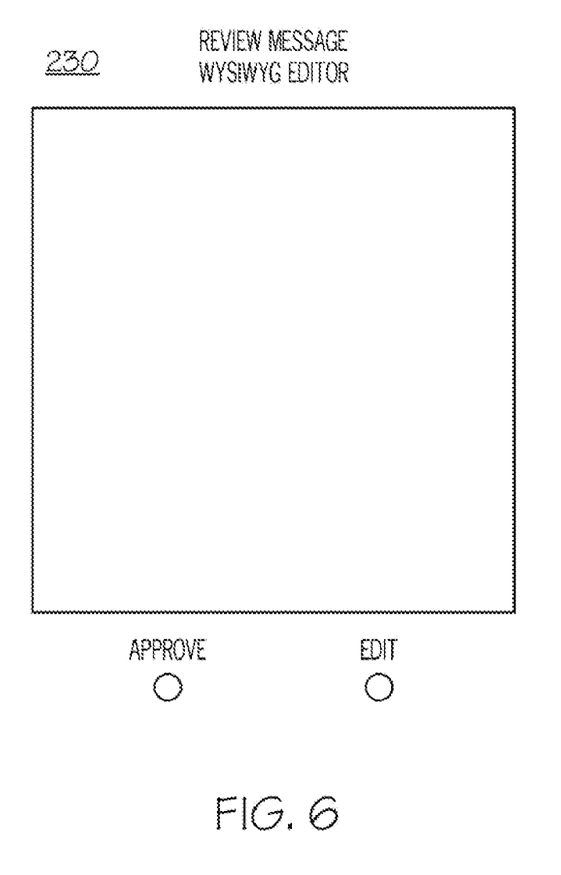

After the message request is authored or uploaded as shown in FIG. 5, the end user will receive a message via email or other notification mechanism (e.g. phone or fax) informing him or her that this message has been created and is ready for review and approval prior to recordation and the addition of music. Referring to FIG. 6, the end user can then go online, enter a secure server, review the message and then approve or edit it using 230, for example, a WYSIWYG editor. After the message is finally approved, it is recorded by the requested male or female voice and the requested background music is added as noted above.

Figure 7:
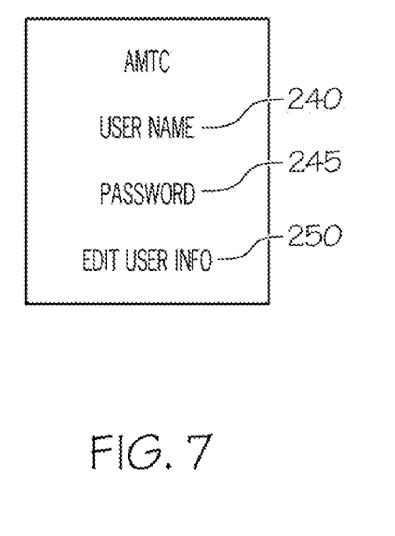

Referring to FIG. 7, it is to be emphasized that in a preferred system, access is password protected. When a customer initially is provided access to the system, he is provided a default login 240 and password 245. The password may be an automatically generated record ID. The system may manually set the access expiration date. The user will typically be notified of the initial login and password so he could gain access. The user could change request to edit information 250 via an accounts settings screen.

If the end user is new to the system, the option may include an online payment option which will then be activated and associated with the billing subsystem 110. A user would sign up for the service and renew via a commonly known payment method such as Visa, Mastercard, Amex, Discover, Paypal, etc.

Each audio file will therefore have a record in the database 150. The record will contain the title of the file and the full text of the narration contained in the file and will identify a "group" to which the record belongs. Groupings may be based upon the types of recordings. For example, Groups may include seasonal messages, directions to the business, or specific product or service offerings.

In operation, the end user customer 16, 18 will login and be presented with the titles of the audio records available to him, as determined by his end user configuration. The end user may select the files the user wishes to download and a local destination drive on his machine. The user can then copy the desired files from the local drive to a compact flash card using, for example, a USB card writer peripheral device. Because the flash card writer will appear as a local drive, the user may be able to download directly to the compact flash card.

Figure 8:
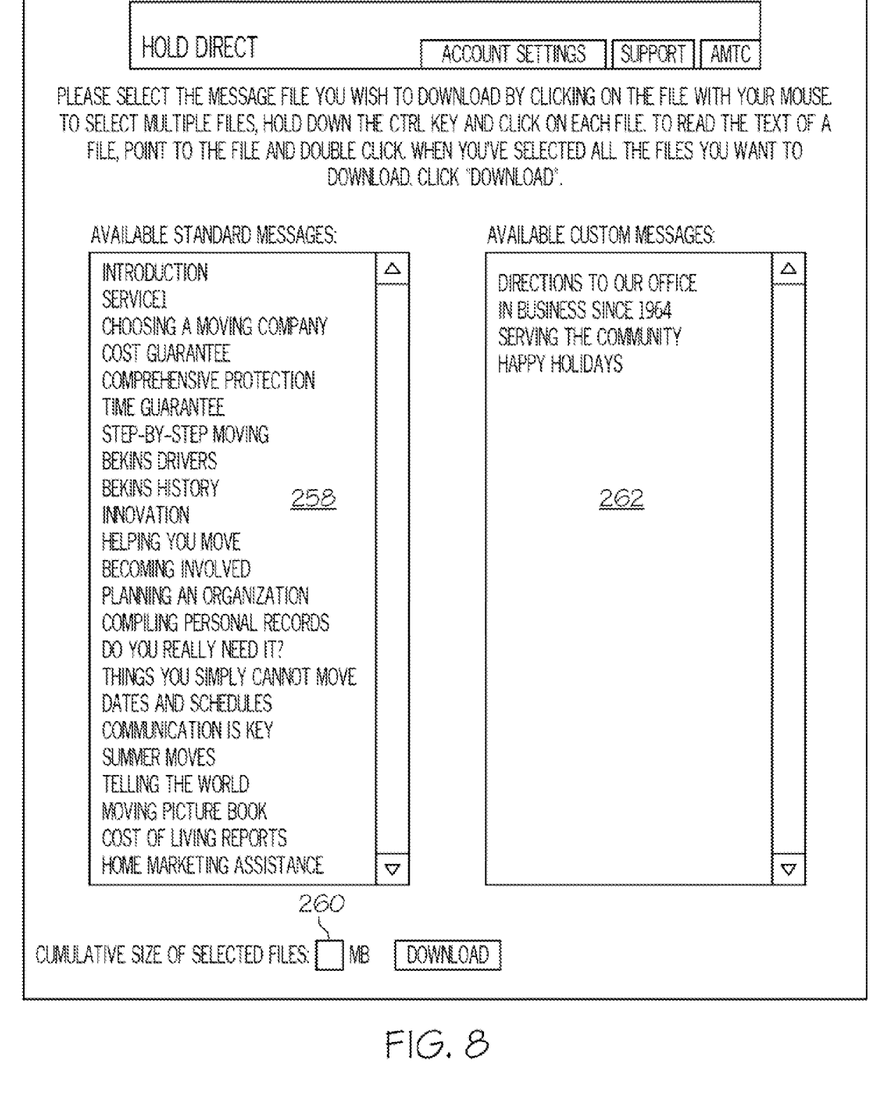

More specifically, as shown in FIG. 8, the system for accessing and downloading files is shown in detail in the context of a series of on-hold messages for a fictional "Moving Company." The user highlights one or more files from the left and/or right windows of screen using standard Windows. As files are selected 258, the cumulative total size of all files selected is displayed as shown 260. Users will be able to use compact flash cards of any desired capacity. This permits users to keep track of their running total for the selected files, to make sure they don't select more than their flash card can hold. Custom messages 262 are provided as well.

When a user double-clicks a file, a popup window displays the filename and text for that file. The user may then click the "Next" button so that the "Save to" screen appears to allow the user to designate the local destination drive for the files. To stop users from playing MP3 files downloaded from other sources, and to prevent the sharing of files between owners of our players, the MP3 files will be encrypted so they can only be played on the user's specific player. This encryption will be performed by a separate program. When the user clicks "Download" on the download screen, the system queries a 6-digit player serial number and sends this serial number along with the selected files to the encryption program, which will encrypt the MP3 data with the 6-digit serial number.

Figure 9:
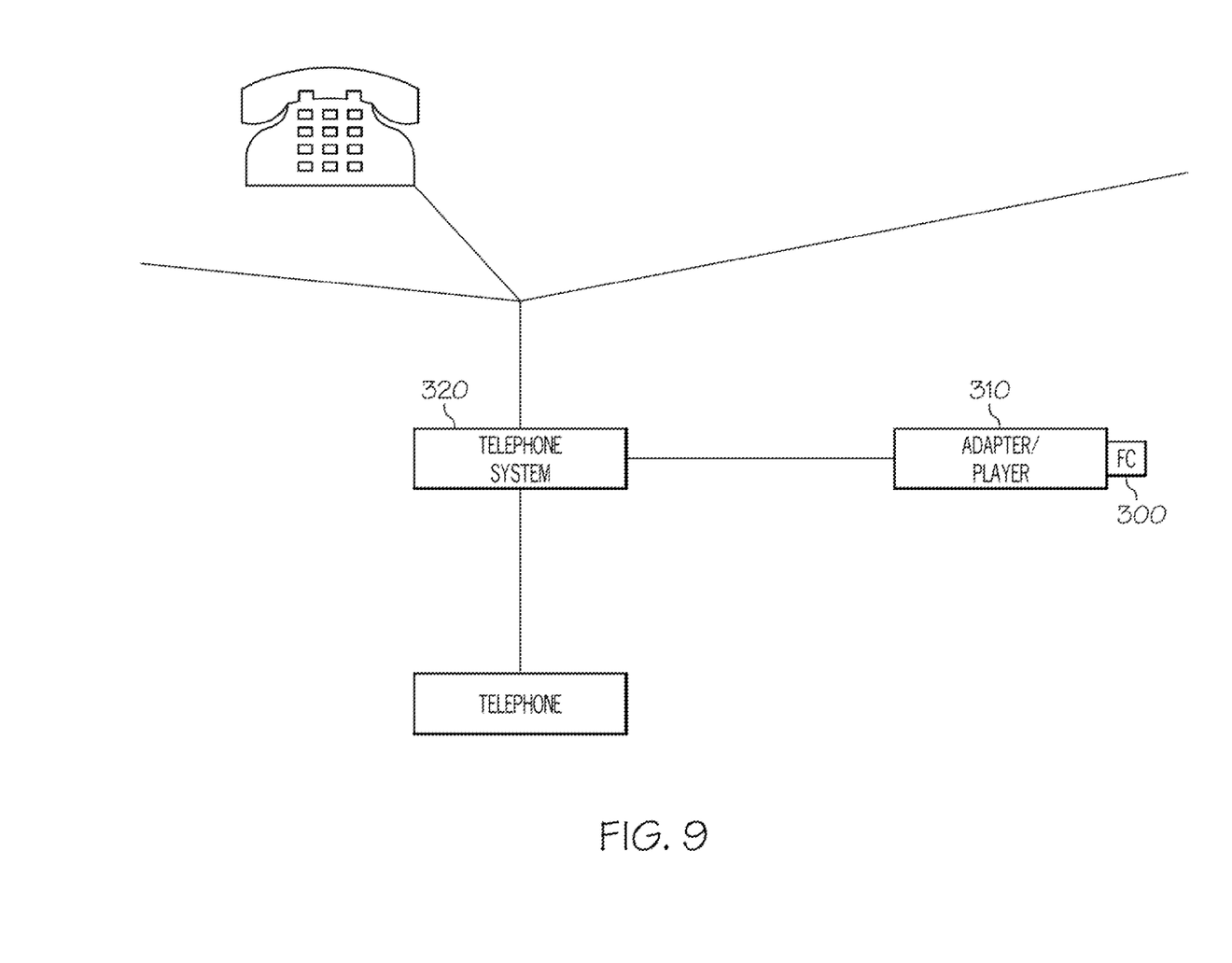
FIG. 9 is a diagram of the present invention used with a telephone system.

The new, encrypted files are "returned" to the downloading application and are sent online to the user and copied on to the compact flash card 308. A typical "downloading progress" gauge may be displayed during encryption/downloading, and a "complete" message displayed at conclusion, with two buttons available for the user to select "Download more files" (which would simply close the download screen, revealing the file download page again) or "logout" as shown in FIG. 9. The card then is inserted into a player/adaptor 310 which is associated with the telephone system 320 and which activates when customers are placed on hold.

Figure 10A:
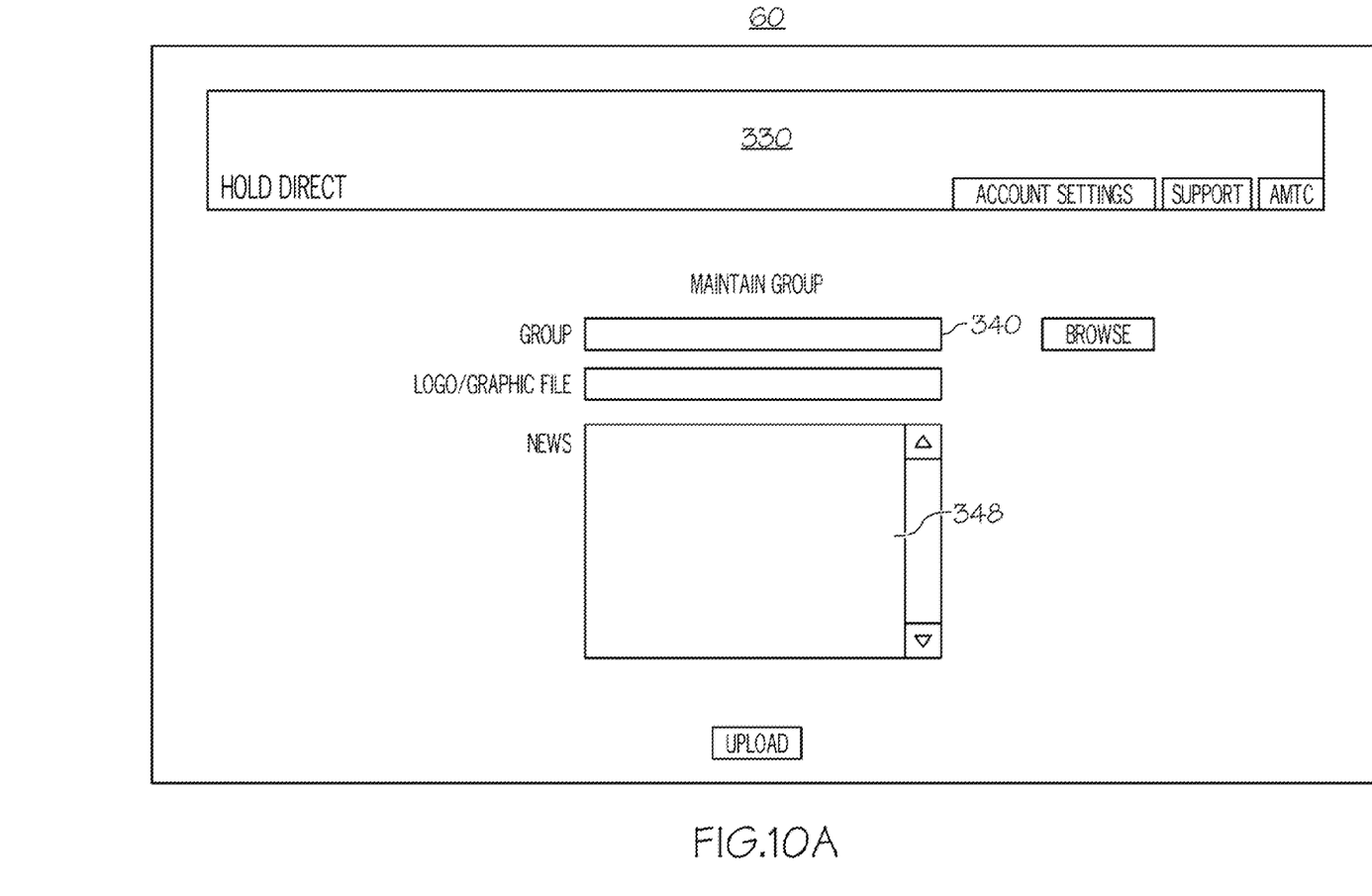
FIGS. 10a and 10b illustrate user screens for use in conjunction with the administration system of the invention.

The administrator station 60 is now more fully described. FIG. 10a illustrates a screen for maintaining a group 330. The administrator may be prompted to either enter a group or select it from a drop list 340. If no database record for the group exists, administrator may either enter a path/filename of a logo graphic or select it using a standard browse feature.

The administrator station 60 may access an input screen 348 that allows administrator to type your news item, which can be posted on a greeting page at the end of any existing news, stamping the data automatically. After some preset period of time old news could be timed for automatic removal.

Figure 10B:
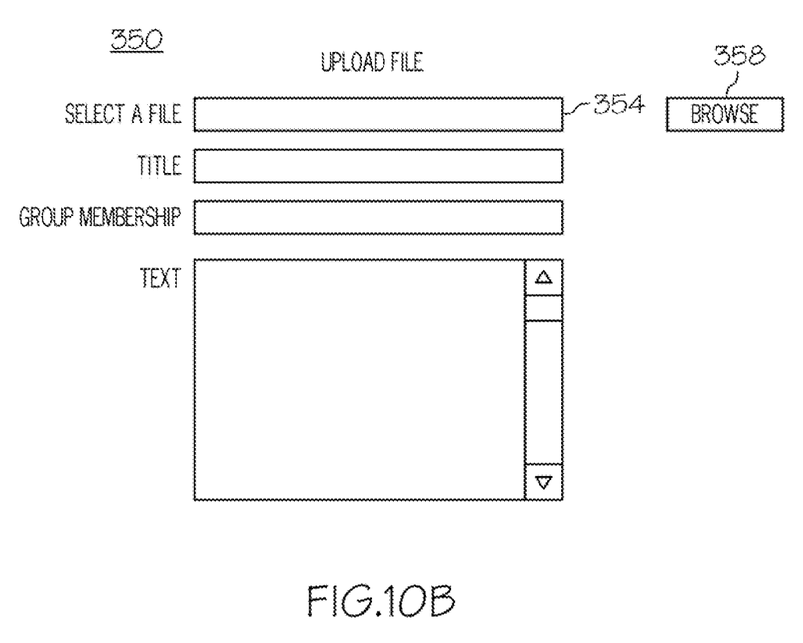

FIG. 10b illustrates a file uploading screen 350. The administrator may either enter the path/filename of the audio file to be uploaded 354 or select it using a standard browse feature 358. The administrator may further enter a descriptive title for the file. The administrator selects the group membership for the file from a drop list. The administrator then enters the text of file. The administrator clicks the "Upload" button. A new audio file record will therefore be created in the database.

The present invention has been described with reference to the enclosed Figures and preferred embodiment. It is to be appreciated that the true nature and scope of the invention is to be determined with reference to the claims appended hereto.

The invention claimed is:

1. A method comprising the steps of:
   (a) accessing a website via the internet;
   (b) uploading a plurality of files to a database via the website, the plurality of files having stored thereon different on-hold messages;
   (c) downloading a portion of the plurality of files via the website onto a flash drive installed on an end user computer;
   (d) removing the flash drive from the end user computer;
   (e) attaching the flash drive to a telephone system comprising a player for playing the on-hold messages stored on the flash drive; and
   (f) playing at least one of the on-hold messages on the telephone system using the player when a caller to the telephone system is placed on hold.

2. The method of claim 1, further comprising the step of: editing one of the files stored on the database.

3. The method of claim 1, wherein the one of the files uploaded onto the database comprises a script, and the method further comprises the step of: recording the script in a male or female voice.

4. A method comprising the steps of:
   (a) accessing a website via the internet;
   (b) uploading a plurality of files to a database via the website, the plurality of files having stored thereon different messages;
   (c) downloading a portion of the plurality of files via the website onto a flash drive installed on an end user computer;
   (d) removing the flash drive from the end user computer;
   (e) attaching the flash drive to a player for playing the messages stored on the flash drive; and
   (f) playing at least one of the messages on the player to a caller placing a telephone call to a telephone system on which the player is installed.

5. A method comprising the steps of:
(a) accessing a website via the internet;
(b) composing a script comprising a message and uploading a file comprising the composed script to a database via the website;
(c) downloading the file via the website onto a flash drive installed on an end user computer;
(d) removing the flash drive from the end user computer;
(e) attaching the flash drive to a device comprising a player for playing the message stored on the flash drive; and
(f) playing the message on the player to a caller who communicatively connects to the device.

6. The method of claim 5, wherein the message is an on-hold message, the device is a telephone system, and the on-hold message is played on the telephone system using the player when a caller to the telephone system is placed on hold.

* * * * *